F. VILLA.
ANIMAL TRAP.
APPLICATION FILED AUG. 14, 1919.

1,331,132.

Patented Feb. 17, 1920.

Inventor
François Villa
By
Attorney

UNITED STATES PATENT OFFICE.

FRANÇOIS VILLA, OF MONTREAL, QUEBEC, CANADA.

ANIMAL-TRAP.

1,331,132.  Specification of Letters Patent.  Patented Feb. 17, 1920.

Application filed August 14, 1919. Serial No. 317,458.

*To all whom it may concern:*

Be it known that I, FRANÇOIS VILLA, residing at 142 Cadieux street, in the city of Montreal, in the Province of Quebec, in the Dominion of Canada, have invented certain new and useful Improvements in Animal-Traps; and I do hereby declare that the following is a full, clear, and exact description of the same.

The present invention relates to improvements in animal traps and the main object of this invention is to provide a trap of this character that can be very easily set and that is cheap of construction.

To better understand the invention reference should be had to the accompanying drawings in which.

Like numerals of reference indicate corresponding parts in each figure.

In the drawings.

Figure 1:
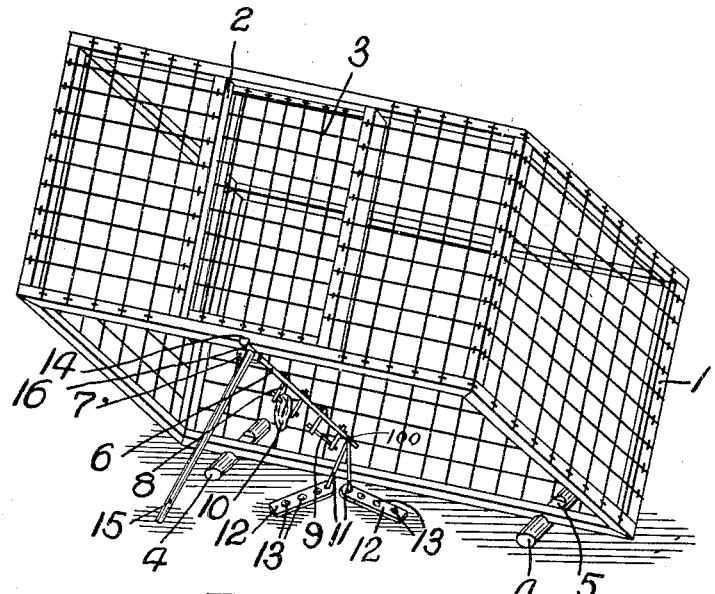
Figure 1 is a perspective view of the trap in its operative position.
Figure 2:
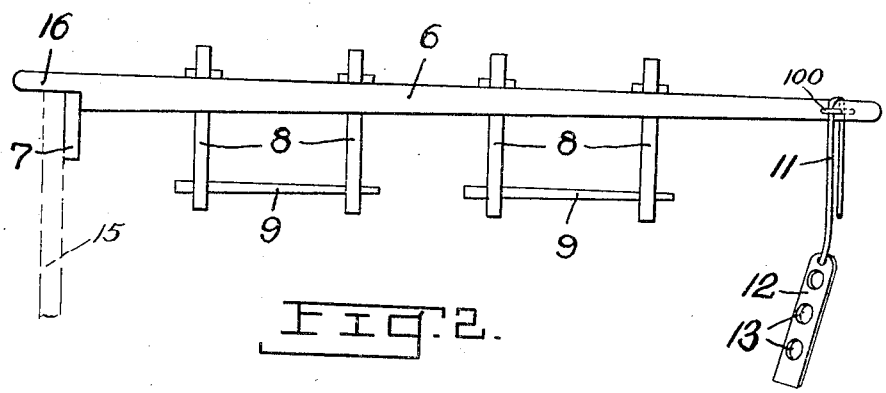
Fig. 2 is an enlarged side elevation of the tripping bar.

1 is a rectangular casing, the frame work of which is preferably covered with a wire netting and is open at its bottom, said casing having an opening 2 in one wall thereof which is closed by a sliding door 3. The trap casing is preferably mounted at the lower edge of the rear wall on the blocks 4 which are provided with grooves 5 in which the said edge fits. 6 is a tripping bar provided adjacent its front end with the downwardly projecting flange 7 and in rear thereof with pairs of downwardly projecting lugs 8 suitably spaced from one another, each pair of projecting lugs having their lower ends connected by a pin 9, the ends of which fit in open rings in said lugs. On this pin 9 is preferably supported the bait 10. At the free end of said tripping bar is provided a flexible element 11, such as a cord or the like, which is passed over the end of the bar and secured thereto by a suitable fastener 100 to prevent it from slipping; and at each end of said cord is secured a plate 12 which is provided on one face thereof with a plurality of holes or depressions 13 to receive grain or any other suitable bait used to attract animals that do not feed on meat such as deer, the arrangement being such that the plates are tilted slightly upward.

In the lower edge of the front wall of the trap casing is provided a slot 14 in which fits the front end of the tripping bar 6, and 15 is a rod or bar which is adapted to fit in the seat formed by the intersection of the flange 7 and the outwardly projecting end 16 of the tripping bar 6. Said rod is preferably placed at an angle as illustrated in Fig. 1 of the drawings and it is so arranged that at the least pressure on any part of the tripping member 6 or on the plates 12, said rod will be caused to fall and release the casing which is normally held in tilted position with its front wall raised.

What I claim as my invention is:

1. In an animal trap, the combination of a casing adapted to tilt upon its lower rear edge; a tripping bar disposed transversely of the casing and having its front end extending beneath and removably engaged with the lower front edge of said casing, said bar being provided adjacent its said end with a seat; a bait holder connected with said bar in rear of said seat; and a supporting member for normally holding the casing in upwardly-tilted position having its upper end engaged in said seat but releasable therefrom when downward pressure is exerted immediately upon the bait holder.

2. In an animal trap, the combination of a casing adapted to tilt upon its lower rear edge; a tripping bar disposed transversely of the casing and having its front end extending beneath and removably engaged with the lower front edge of said casing, said bar being provided adjacent its said end with a seat; a plate disposed beneath the casing and adapted to rest at one end upon the ground, said plate having its other end connected with the rear end of said bar so as to be held slightly above the ground; bait-holding means on said plate; and a supporting bar for normally holding the casing in upwardly-tilted position having its upper end engaged in said seat but releasable therefrom when downward pressure is exerted immediately upon the plate.

3. In an animal trap, the combination of a casing adapted to tilt upon its lower rear edge; a tripping bar disposed transversely of the casing and having its front end extending beneath and removably engaged with the lower front edge of said casing, said bar being provided adjacent its said end with a seat; a plate disposed beneath the casing and adapted to rest at one end upon the ground, said plate having a bait-receiving depression in its upper face and having its other end connected with the rear end of said bar so as to be held slightly above the ground; and a supporting bar for normally holding the casing in upwardly-tilted position having its upper end engaged in said seat but releasable therefrom when downward pressure is exerted immediately upon the plate.

4. In an animal trap, the combination of a casing adapted to tilt upon its lower rear edge; a tripping bar disposed transversely of the casing and having its front end extending beneath and removably engaged with the lower front edge of said casing, said bar being provided adjacent its said end with a seat; a plate disposed beneath the casing and adapted to rest at one end upon the ground; bait-holding means on the upper face of said plate; a flexible connection between the rear end of bar and the other end of said plate for holding the said other end of the plate slightly above the ground; and a supporting member for normally holding the casing in upwardly-tilted position having its upper end engaged in said seat but releasable therefrom when downward pressure is exerted immediately upon the plate.

Signed at Montreal, Canada, this 14th day of July 1919.

FRANÇOIS X VILLA.
his mark

Witnesses:
  B. WOOD,
  C. PATENAUDE.